United States Patent Office 3,690,829
Patented Sept. 12, 1972

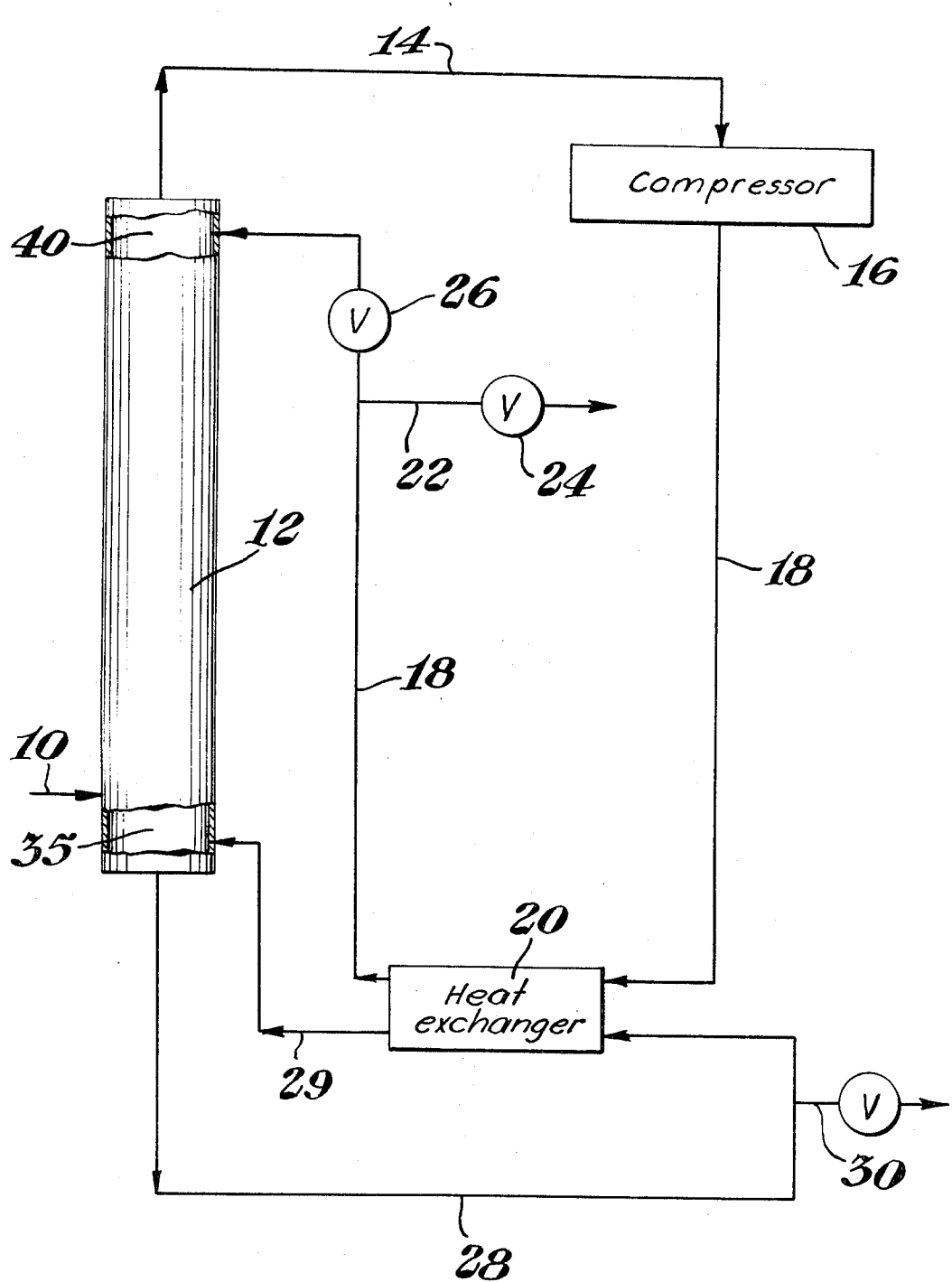

3,690,829
DEUTERIUM SULFIDE SEPARATION AND ITS CONVERSION TO DEUTERIUM OXIDE
David N. Glew and Ewart C. Clarke, Sarnia, Ontario, Canada, assignors to The Dow Chemical Company, Midland, Mich.
Filed May 22, 1970, Ser. No. 39,594
Int. Cl. C01b 5/02, 17/16; F25j 3/00
U.S. Cl. 423—561        8 Claims

ABSTRACT OF THE DISCLOSURE

Disclosed herein is a process for concentrating deuterium values. Specifically, the process comprises distilling a liquid mixture of hydrogen sulfide and deuterium sulfides at a temperature of from about minus 45° C. to about 100° C. The gaseous distillate is enriched with respect to the deuterium sulfides. Ultimately the enriched distillate can be processed to convert the deuterium sulfides to deuterium oxides suitable for use as moderators in nuclear reactors.

BACKGROUND OF THE INVENTION

Deuterium oxide ($D_2O$) is highly valued as a moderator in atomic reactors. However, due to the similarity in the physical and chemical properties of $D_2O$ and $H_2O$, concentration and separation of $D_2O$ from $H_2O$ is a very costly process.

Presently the most economical process for separating $D_2O$ from $H_2O$ is the Spevak process, disclosed in U.S. Pats. 2,787,526 and 2,895,803. The Spevak process takes advantage of the fact that the equilibrium constant for the reaction $$H_2O + HDS \rightleftharpoons HDO + H_2S$$

increases significantly as the temperature is lowered, thereby making it possible to concentrate deuterium values in a cooled aqueous phase by dual temperature chemical exchange techniques.

Other methods of separating deuterated compounds from the corresponding hydrogenated compounds have been proposed. The method of Pogorski (see Canadian Pat. 711,458) takes advantage of the fact that the vapor pressure of deuterated methane ($CH_3D$) is greater than the vapor pressure of normal methane ($CH_4$). The deuterated methanes can therefore be separated from normal methane by distillation.

A great deal of effort has also been expended in propounding quantum mechanical theories which will support predictions concerning the presence and extent of vapor pressure differences between deuterated compounds and the corresponding hydrogenated compounds. In this respect, the work of Bigeleisen et al. [J. Chem. Phys. 34, 1485 (1961) and J. Chem. Phys. 60, 35 (1963)] is relevant. Bigeleisen theorizes that for many isotopic substances, a "crossover" phenomena should be observed, i.e., for two volatile compounds containing different isotopes of the same element, there should exist a range of temperatures over which the vapor pressure of the compound containing the heavier isotope exceeds the vapor pressure of the compound containing the lighter isotope. Presently, however, the Bigeleisen theory is not sufficiently accurate and definite to be of practical value in providing a process of isotopic separation. For example, the theory does not predict whether the crossover effect will occur above or below the critical temperature of hydrogen sulfide.

Where it is desired to separate deuterated sulfides from hydrogen sulfides, the difficulties in propounding a practical theory are further compounded by a lack of accurate data concerning vapor pressures of the deuterated sulfides and hydrogen sulfide. More specifically, Kruis et al. [Z. Physik. Chem. 38B, 156 (1937)], and Kiss et al. [Kernenergie, 5, 329 (1962)] have both observed that the vapor pressure of deuterated sulfides is lower than the vapor pressure for hydrogen sulfide.

DESCRIPTION OF THE DRAWINGS

The drawing is a flow diagram for an embodiment of the invention.

DESCRIPTION OF THE INVENTION

The present invention is based upon the discovery that, contrary to the above-described observations, the vapor pressure of the deuterated sulfides actually exceeds the vapor pressure for hydrogen sulfide over the range of temperatures from about minus 45° C. to about 100° C. This phenomenon is illustrated by the vapor pressure measurements at various temperatures that are set forth in Table I. In the table, the symbol $P_{H_2S}$ represents the vapor pressure of hydrogen sulfide, and $P_{D_2S}$ represents the vapor pressure for deuterium sulfide.

TABLE I

| Temperature, °C. | $P_{H_2S}$ (p.s.i.a.) | $P_{D_2S}$ (p.s.i.a.) | $P_{D_2S}/P_{H_2S}$ |
|---|---|---|---|
| 45.000 | 462.92 | 470.40 | 1.0162 |
| 35.000 | 370.71 | 376.35 | 1.0152 |
| 30.023 | 330.13 | 334.91 | 1.0144 |
| 20.024 | 258.31 | 261.98 | 1.0142 |
| 9.996 | 198.56 | 201.16 | 1.0131 |
| −0.009 | 149.67 | 151.29 | 1.0108 |
| −9.997 | 110.35 | 111.41 | 1.0096 |
| −19.826 | 79.69 | 80.34 | 1.0082 |
| −28.194 | 59.07 | 59.41 | 1.0058 |

The present invention comprises distilling a liquid mixture consisting of hydrogen sulfide and deuterium sulfides, i.e., mono-deuterium sulfide (HDS) and deuterium sulfide ($D_2S$). The distillation is carried out at pressures of from about 30 to about 1300 pounds per square inch (p.s.i.a.), and at corresponding temperatures, i.e., from about minus 45° C. to about 100° C. Preferably distillation will proceed at pressures from about 330 to 463 p.s.i.a. and at temperatures within the range of from about 30° C. to about 45° C. due to the increased vapor pressure of the deuterium sulfides in relation to $H_2S$ over the range of from about minus 45° C. to 100° C., the overhead vapor phase will be enriched in deuterium sulfides in relation to the liquid phase.

The deuterium-enriched overheads can be collected and used directly in biological isotopic tracing experiments.

Optionally, the deuterium values in the enriched vapor phase can be converted to deuterium oxide as by reacting with water (as in the Spevak process cited above) to yield an aqueous solution of deuterium oxides. The deuterium oxide-enriched solution can be further processed by vacuum distillation and/or electrolysis to yield essentially pure deuterium oxide ($D_2O$). In addition, the enriched vapor phase can be liquefied and redistilled according to the process to provide further enrichment. Alternatively, when the concentration of deuterium sulfides reaches the desired level, the sulfides can be oxidized by burning with air or oxygen to provide deuterium oxide. For a better understanding of the invention, reference should be made to the accompanying drawing and descriptive matter in which a preferred embodiment of the invention is described.

With reference to the figure, the condenser, distillation column and heat exchanger communicate by means of conduits, e.g., pipes. Hydrogen sulfide enters the system through conduit 10 which discharges into distillation column 12. The top portion of the column communicates with recirculatory pipe 14 which discharges into a gas phase compressor 16. The compressor discharges into compressed phase conduit 18 which is in heat releasing engagement with heat exchanger 20. Conduit 18 communicates with product withdrawal conduit 22. Product withdrawal valve 24 is in regulating engagement with conduit 22. Conduit 18 also communicates with valve 26 before discharging into the upper portion of the distillation column 12.

The bottom-most portion of column 12 discharges into conduit 28 which communicates with valved waste conduit 30. Conduit 28 is also in heat absorbing engagement with heat exchanger 20, before discharging into conduit 29 and thence into the bottom portion of the distillation column 12.

In an embodiment of the invention, liquid hydrogen sulfide is passed through conduit 10 into the distillation column. The feed rate of liquid hydrogen sulfide will vary with the size of the column, distillation efficiency desired, and other factors. The concentration of deuterium sulfides in the entering stream is not critical and will vary from about 0.014 to about 99.8 mole percent.

The distillation column 12 is conveniently a large commercial column and should be constructed of materials substantially resistant to corrosion by $H_2S$. Suitable materials are mild steel, stainless steel of type 304 and type 316, and titanium.

Due to the relatively small difference in vapor pressures between $H_2S$ and the desired deuterated sulfides, the column should possess extensive interior surfaces available for condensation. In terms of theoretical plates, the column should possess at least 390 theoretical plates, and preferably 450 theoretical plates. The requisite number of theoretical plates can be conveniently provided by a cylindrical, vertically-mounted steel column containing Raschig rings, or similar liquid condensation media. For best results, the reflux ratio should be at least 1300:1 and preferably should be 1400:1. If desired, columns with less than the above-designated number of theoretical plates can be employed; however, in doing so, the efficiency of the distillation is reduced. Similarly, a decrease in reflux ratio will have a detrimental effect on distillation efficiency.

In operating the column, the vapor pressure at the bottom of the column will be greater than the vapor pressure at the top of the column. This phenomenon called pressure drop should be reduced as much as possible. For example, if the liquid hydrogen sulfide stream entering the column is distilled at a temperature of about 36° C. and creates a vapor pressure of about 379 p.s.i.a., as measured at point 35, the pressure and temperature of the gas phase at the top of the column, as measured at point 40, should be about 362 p.s.i.a., and about 34° C., respectively; i.e., the pressure drop should be about 17 p.s.i.

During the distillation process, liquid hydrogen sulfide partially depleted of the more volatile deuterium sulfides, moves to the bottom portion of the column, and passes through a pipe 28. Some of the deuterium-depleted hydrogen sulfide stream is removed through pipe 30. The main stream is passed through heat exchanger 20 thereby to produce a gaseous phase. The volatilized phase is discharged through pipe 29 into the bottom portion of column 12, and is redistilled.

The deuterium-enriched gaseous distillate is passed from the top portion of column 12 through pipe 14. Pipe 14 discharges into a gas compressor 16. Compressed gases from compressor 16 pass through pipe 18 and heat exchanger 20 where they are liquefied. The liquefied phase passes through pipe 18 and valve 26 and ultimately re-enters the top portion of the column as reflux. Valve 24 permits continuous removal from the system of part of the enriched liquid phase through pipe 22. If further concentration of the deuterium sulfides is desired, the flow from pipe 22 can be directed into the feed pipe 10 of a column similar to column 12 described above. By employing a multiplicity of such columns, a final enriched product consisting of substantially pure deuterium sulfides can be obtained. Optionally, the enriched liquid phase passing through pipe 22 can be reacted with water at a temperature above 30° C. to yield deuterium oxides from which liquid $D_2O$ can be obtained by the overhead vacuum distillation of $H_2O$ and/or electrolysis. Alternatively, it can be burned in air or oxygen to yield deuterium oxides from which liquid $D_2O$ can be obtained.

The following example is set forth to further illustrate the invention.

EXAMPLE

Employing distillation apparatus similar to that depicted schematically in the figure, a flow of about 7,000 pounds/hour of liquid hydrogen sulfide containing about 0.0143 mole percent of HDS is passed through pipe 10 into the bottom portion of distillation tower 12. Tower 12 is packed with wire gauze Raschig rings, and provides a total of about 390 theoretical plates. The plate efficiency is about 80 percent. The reflux ratio in the tower is about 1,300 to 1. The temperature of the overhead vapors in the top portion of the tower at point 40 is about 35° C., and the vapor pressure is about 371 p.s.i.a. The HDS concentration in the overhead is about 0.1429 mole percent.

The overhead vapors pass through pipe 14 at a rate of about 46,301 pounds/hour and are compressed by compressor 16 to give super-heated vapors. The compressor develops about 105 horsepower, and operates with an efficiency of about 77 percent.

The super-heated vapors are cooled in heat exchanger 20 to yield a liquid phase having a temperature of about 38° C. The resulting liquid phase passes from the heat exchanger through pipe 18 and communicates with pipe 22 from which a product stream of liquid is withdrawn at the rate of about 35 pounds/hour. The portion of the liquid stream not taken off as product is returned to the tower as reflux.

From the bottom of the tower, deuterium-depleted liquid hydrogen sulfide passes through pipe 30 at a rate of about 6,965 pounds/hour. The concentration of HDS in the stream is about 0.01364 mole percent. The liquid hydrogen sulfide stream is recirculated and vaporized by passing through heat exchanger 20 and is returned through pipe 29 to the bottom portion of the tower as saturated vapor.

In the above-described example, the temperature drop in the tower is about 1° C., and the pressure drop is about 8 p.s.i. The concentration of deuterium values in the product stream taken off through pipe 22 is enriched by a factor of about ten in relation to the concentration of the stream entering through pipe 10.

What is claimed is:

1. A process comprising distilling a liquid mixture of hydrogen sulfide and deuterium sulfides at a pressure of from about 30 to about 1,300 p.s.i.a. and at a temperature in the range of about −45° C. to about 100° C. and collecting the gaseous deuterium sulfide-enriched overheads.

2. The process as in claim 1 wherein the liquid mixture is distilled at a pressure of from 330 p.s.i.a. to 463 p.s.i.a.

3. The process as in claim 1 and including the steps of reacting the gaseous overheads with water to produce deuterium oxides and further concentrating the oxides by vacuum distillation or electrolysis.

4. The process as in claim 1 and including the steps of redistilling the deuterium sulfide-enriched phase, and oxidizing the distillate to yield deuterium oxide.

5. The process as in claim 1 comprising: (a) providing a liquid mixture of hydrogen sulfide and deuterium sulfide at a temperature of from 30° C. to 45° C.; (b) passing said mixture into the bottom portion of a distillation column having at least 390 theoretical plates, said column being operated at a reflex ratio of at least 1,300 to 1; (c) heating and vaporizing a portion of the mixture thereby to provide gaseous deuterium sulfide-enriched overheads; (d) passing the overheads from the top of said column; and (e) collecting the gaseous overheads.

6. The process as in claim 1 and including the steps of compressing and liquefying the deuterium sulfide-enriched vapors, and returning a part of the liquid phase as reflux into the top portion of the column.

7. The process as in claim 6 and including the steps of passing a stream of deuterium sulfide-depleted liquid from the bottom of the distillation column, heating said liquid by heat exchange with the liquefying, compressed deuterium sulfide-enriched vapors and passing the resulting heated deuterium sulfide-depleted vapors back into the distillation column.

8. The process as in claim 5 and including the steps of compressing and liquefying the deuterium sulfide-enriched vapors, and returning a part of the liquid phase as reflux into the top portion of the column.

References Cited

UNITED STATES PATENTS

| 3,399,967 | 8/1968 | Pogorski | 23—204 R |
| 2,787,526 | 4/1957 | Spevack | 23—204 R |
| 3,081,156 | 3/1963 | Orbach et al. | 23—204 R |

OTHER REFERENCES

Bigeleisen: The Journal of Chemical Physics, vol. 34, No. 5, May 1961, p. 1485.

OSCAR R. VERTIZ, Primary Examiner

H. S. MILLER, Assistant Examiner

U.S. Cl. X.R.

62—11; 423—563, 580